United States Patent
Kim et al.

(10) Patent No.: US 12,504,761 B2
(45) Date of Patent: Dec. 23, 2025

(54) PICK-UP SYSTEM OF AUTONOMOUS CHARGING ROBOT FOR ELECTRIC VEHICLE

(71) Applicant: Handa Lab Co., Ltd, Daejeon (KR)

(72) Inventors: Sang-Min Kim, Chungcheongbuk-do (KR); Soo-Ho Kim, Chungcheongbuk-do (KR); Jae-Gyun Yoo, Chungcheongbuk-do (KR); Mun Chae Joung, Chungcheongbuk-do (KR)

(73) Assignee: Handa Lab Co., Ltd, Daejeon (KR)

( * ) Notice: Subject to any disclaimer, the term of this patent is extended or adjusted under 35 U.S.C. 154(b) by 98 days.

(21) Appl. No.: 18/381,777

(22) Filed: Oct. 19, 2023

(65) Prior Publication Data

US 2024/0411310 A1     Dec. 12, 2024

(30) Foreign Application Priority Data

Jun. 8, 2023    (KR) ........................ 10-2023-0073633

(51) Int. Cl.
    *G05D 1/00*         (2006.01)
    *B60L 53/35*       (2019.01)

(52) U.S. Cl.
    CPC ............ *G05D 1/0225* (2013.01); *B60L 53/35* (2019.02)

(58) Field of Classification Search
    CPC .............................. G05D 1/0225; B60L 53/35
    See application file for complete search history.

(56) References Cited

U.S. PATENT DOCUMENTS

| | | | |
|---|---|---|---|
| 10,716,192 B1* | 7/2020 | Tsibulevskiy | H02J 7/0049 |
| 2021/0348927 A1* | 11/2021 | Imai | G01C 21/206 |

(Continued)

FOREIGN PATENT DOCUMENTS

| | | | |
|---|---|---|---|
| CN | 103552059 A | * | 2/2014 |
| CN | 211417877 U | * | 9/2020 |
| CN | 112198871 A | * | 1/2021 |

(Continued)

OTHER PUBLICATIONS

Mahaadevan et al., "AViTRON: Advanced Vision Track Routing and Navigation for Autonomous Charging of Electric Vehicles", Jan. 25, 2024, All Pages (Year: 2024).*

*Primary Examiner* — Fadey S. Jabr
(74) *Attorney, Agent, or Firm* — Harness, Dickey & Pierce, P.L.C.

(57) ABSTRACT

Disclosed is a pick-up system including a pick-up target configured to provide a pick-up feature point, a pick-up unit configured to pick up the pick-up target, a correction marker that is a three-dimensional structure installed around the pick-up target, a scanner configured to use structured light, detect a target object including the pick-up target and the correction marker installed around the pick-up target, and create a point cloud including the pick-up feature point and the correction feature points, an analysis unit configured to calculate pick-up information including posture information and movement information, which allow the pick-up unit to pick up the pick-up target, by comparing the pick-up feature point and the correction feature points, and three-dimensional shape information on the pick-up target and the correction marker installed around the pick-up target, and a control unit configured to control a posture and movement of the pick-up unit.

1 Claim, 4 Drawing Sheets

(56) References Cited

U.S. PATENT DOCUMENTS

2023/0373333 A1* 11/2023 Zhou .................. B25J 9/1697
2023/0390934 A1* 12/2023 Christy .............. B25J 9/1664

FOREIGN PATENT DOCUMENTS

| CN | 113978297 | A | * | 1/2022 | ............ B60L 53/16 |
| CN | 114475861 | A | * | 5/2022 | |
| CN | 115593262 | A | * | 1/2023 | |
| CN | 117141279 | A | * | 12/2023 | ............ B60L 53/37 |
| KR | 10-2014333 | B1 | | 8/2019 | |
| KR | 10-2020-0030932 | A | | 3/2020 | |
| KR | 10-2023-0051868 | A | | 4/2023 | |
| WO | WO-9857782 | A1 | * | 12/1998 | ........... B25J 9/1692 |
| WO | WO-2019024863 | A1 | * | 2/2019 | .......... A47L 11/4011 |
| WO | WO-2023022642 | A1 | * | 2/2023 | |
| WO | WO-2023116667 | A1 | * | 6/2023 | |

* cited by examiner

PICK-UP SYSTEM OF AUTONOMOUS CHARGING ROBOT FOR ELECTRIC VEHICLE

CROSS-REFERENCE TO RELATED APPLICATIONS

This application claims the priority of Korean Patent Application No. 10-2023-0073633 filed on Jun. 8, 2023, in the Korean Intellectual Property Office, the disclosure of which is incorporated herein by reference.

FIELD

The present disclosure relates to a pick-up system of an autonomous charging robot for an electric vehicle, and more particularly, to a pick-up system of an autonomous charging robot for an electric vehicle that uses a correction marker for providing a correction feature point, which makes it possible to minimize the occurrence of an error caused by a structured light scanner method and innovatively increase a likelihood of implementation of a pick-up operation with high reliability even in the pick-up system of an autonomous charging robot for an electric vehicle that has a limited resource.

BACKGROUND

This section provides background information related to the present disclosure which is not necessarily prior art.

Recently, the sales of mobile devices that use electrical energy, such as electric vehicles, electric scooters, motorcycles, and electric kickboards, have been increasing rapidly, and the public interest in environmental issues has been growing. In addition, the awareness of environmental-friendly management such as ESG and interest in transportation devices using electric energy is experiencing an explosive growth.

Among the most, the electric vehicle is the most prominent transportation means that uses electrical energy, and there is a global craze for industries related to electric vehicles.

There is a growing interest and expectation not only in the electric vehicles, but also in the technologies associated with the electric vehicles.

However, the performance of currently available electric vehicles depends on the ability of batteries to be charged and discharged, and the time from several tens of minutes to several hours or more is required to recharge the batteries. For this reason, it is difficult to expand and operate public and private charging facilities. In addition, the battery charging time is a realistic barrier to the adoption or purchase of the electric vehicles.

Recently, a charging system, which uses autonomous robots and autonomously charges the vehicle during vehicle parking hours, has been proposed as a charging method to address these issues.

An electric vehicle charging system using an autonomous robot adopts a configuration in which a robot, which may autonomously move to an electric vehicle required to be charged, tows another charging battery configured to supply energy to the electric vehicle, and the autonomous robot autonomously plugs a charging plug of the charging battery into a charging socket of the electric vehicle to charge the electric vehicle.

The robot technology and the autonomous driving technology are technologies that are already commercially available or undergoing rapid technological advancements. However, there have not yet been introduced technologies with practical practicality to implement the electric vehicle charging system using the autonomous robot.

Among the most, in order for the autonomous robot to pick up the charging plug of the charging battery for applying high voltage and high current and plug the charging plug into the charging socket of the electric vehicle, it can be expected that a humanoid robot grips the charging plug and plugs the charging plug into the charging socket.

However, because additional development of autonomous robots and installed artificial intelligence is required to implement the above-mentioned features, the electric vehicle charging system using the autonomous robot has problems that are not easy to solve from the beginning.

The present disclosure relates to a pick-up system of an autonomous charging robot for an electric vehicle, which is capable of recognizing a charging plug and accurately picking up the charging plug, as one of the technologies required for an autonomous robot to plug the charging plug into a charging socket.

SUMMARY

This section provides a general summary of the disclosure and is not a comprehensive disclosure of its full scope or all of its features.

An aspect of the present disclosure provides a pick-up system of an autonomous charging robot for an electric vehicle, which is capable of minimizing an error occurring in a system for measuring a position of a pick-up target while using a structured light scanning system.

One aspect of the present disclosure provides a pick-up system of an autonomous charging robot for an electric vehicle, the pick-up system including: a pick-up target configured to provide a pick-up feature point; a pick-up unit configured to pick up the pick-up target; a correction marker that is a three-dimensional structure installed around the pick-up target and configured to provide a plurality of correction feature points; a scanner configured to use structured light, detect a target object including the pick-up target and the correction marker installed around the pick-up target, and create a point cloud including the pick-up feature point and the correction feature points; an analysis unit configured to calculate pick-up information including posture information and movement information, which allow the pick-up unit to pick up the pick-up target, by comparing the pick-up feature point and the correction feature points, which are extracted on the basis of the point cloud, and three-dimensional shape information on the pick-up target and the correction marker installed around the pick-up target; and a control unit configured to control a posture and movement of the pick-up unit on the basis of the pick-up information.

In the pick-up system of an autonomous charging robot for an electric vehicle according to one aspect of the present disclosure, the correction marker may be formed such that the correction feature points are disposed on an orientation plane that is a plane that meets an orientation line at a right angle, the orientation line being a straight line along which the pick-up unit is directed toward the pick-up target.

In the pick-up system of an autonomous charging robot for an electric vehicle according to one aspect of the present disclosure, the correction marker may be formed such that the correction feature points are disposed in a roll rotation direction about the orientation line.

In the pick-up system of an autonomous charging robot for an electric vehicle according to one aspect of the present disclosure, the correction feature points of the correction marker may be disposed on an arc defined about an orientation point at which the orientation line and the orientation plane meet together.

In the pick-up system of an autonomous charging robot for an electric vehicle according to one aspect of the present disclosure, the correction marker may be formed such that the correction feature points are disposed at equal angles with respect to the orientation point.

In the pick-up system of an autonomous charging robot for an electric vehicle according to one aspect of the present disclosure, the correction marker may have a plate shape and have a plurality of tip shapes disposed on an arc at equal angles with respect to the orientation point and protruding outward, and tips of the tip shapes may define the plurality of correction feature points.

In the pick-up system of an autonomous charging robot for an electric vehicle according to one aspect of the present disclosure, the correction marker may be formed such that the correction feature points are configured as an assembly of the plurality of correction feature points disposed on a plurality of orientation planes parallel to one another.

In the pick-up system of an autonomous charging robot for an electric vehicle according to one aspect of the present disclosure, the pick-up unit may pick up the pick-up target by using an attractive force of an electromagnet or permanent magnet.

In the pick-up system of an autonomous charging robot for an electric vehicle according to one aspect of the present disclosure, the pick-up target may have a polygonal shape having upper and lower proportions or left and right portions that are distinguishable.

In the pick-up system of an autonomous charging robot for an electric vehicle according to one aspect of the present disclosure, the pick-up unit may pick up the pick-up target by being fitted and docked with the pick-up target.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Hereinafter, embodiments of a pick-up system of an autonomous charging robot for an electric vehicle according to the present disclosure will be described in detail with reference to the drawings.

However, it should be noted that the intrinsic technical spirit of the present disclosure is not limited by the following exemplary embodiment, and the following exemplary embodiment may easily be substituted or altered by those skilled in the art based on the intrinsic technical spirit of the present disclosure.

In addition, the terms used herein are selected for convenience of description and should be appropriately interpreted as a meaning that conform to the technical spirit of the present disclosure without being limited to a dictionary meaning when recognizing the intrinsic technical spirit of the present disclosure.

Figure 1:
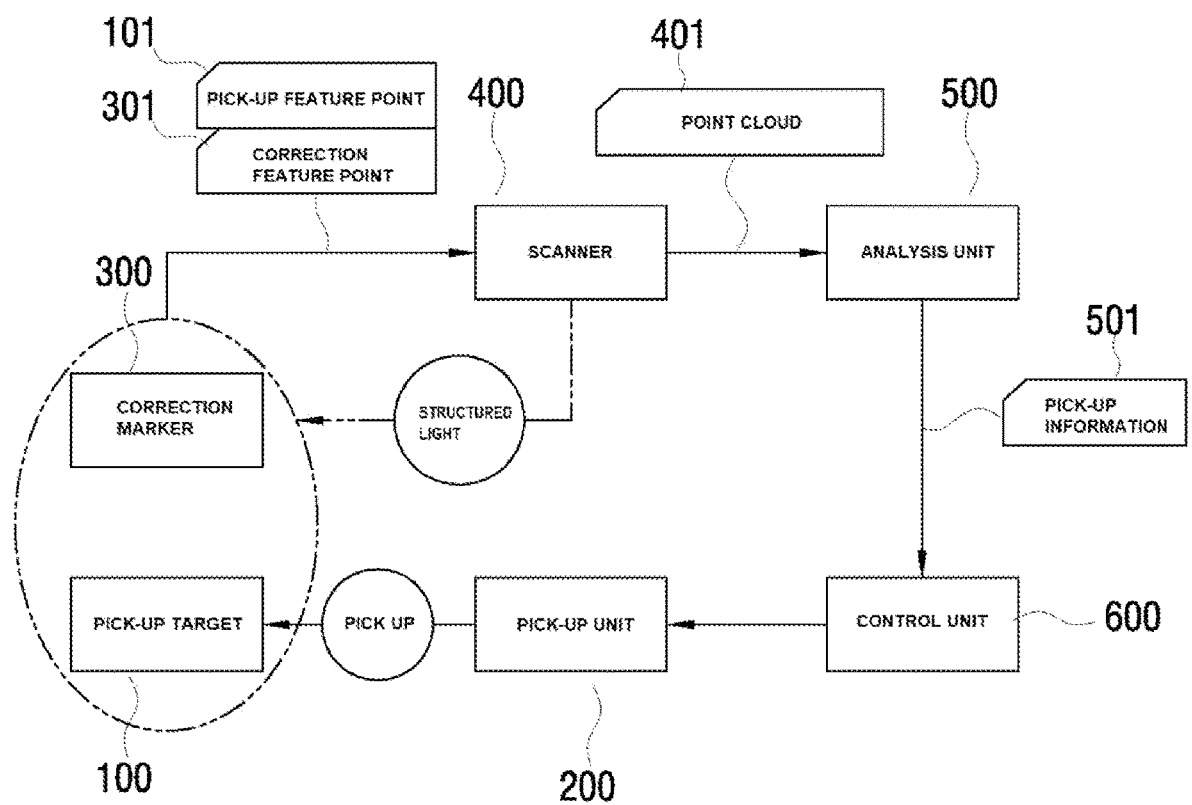
FIG. 1 is a view for explaining an operation of a pick-up system of an autonomous charging robot for an electric vehicle according to the present disclosure.

FIG. 1 is a view for explaining an operation of a pick-up system of an autonomous charging robot for an electric vehicle according to the present disclosure.

With reference to FIG. 1, a pick-up system of an autonomous charging robot for an electric vehicle according to the present disclosure includes a pick-up target 100, a pick-up unit 200, a correction marker 300, a scanner 400, an analysis unit 500, and a control unit 600.

The pick-up target 100 is structured to provide a pick-up feature point 101. The pick-up target 100 is fixed to or attached to any device or object intended to be picked up by the pick-up unit 200 to be described below and provides a target position of a pick-up operation of the pick-up unit 200. More particularly, the pick-up target 100 may provide a physical fastening means as a pick-up mechanism of the pick-up unit 200.

The pick-up feature point 101 may be provided from the morphological properties of the pick-up target 100 detected by structured light emitted from the scanner 400 to be described below.

The pick-up unit 200 moves toward the pick-up target 100 and picks up the pick-up target 100.

The correction marker 300 is a three-dimensional structure installed around the pick-up target 100 and configured to provide a plurality of correction feature points 301 distinguished from the pick-up feature point 101 provided by the pick-up target 100.

The correction feature point 301 may be provided from the morphological properties of the correction marker 300 detected by structured light emitted from the scanner 400 to be described below.

The scanner 400 uses the structured light, detects a target object including the pick-up target 100 and the correction marker 300 installed around the pick-up target 100, and creates a point cloud including the pick-up feature point 101 and the correction feature point 301.

The analysis unit 500 compares the pick-up feature points 101 and the correction feature points 301, which are extracted on the basis of a point cloud 401 created by the scanner, with three-dimensional shape information on the target object, i.e., the pick-up target 100 and the correction marker 300 installed around the pick-up target 100.

In this case, the three-dimensional shapes of the pick-up target 100 and the correction marker installed around the pick-up target 100 are not separately acquired three-dimensional shapes of the pick-up target 100 and the correction marker 300, but a single acquired three-dimensional shape of the pick-up target 100 and the correction marker 300 installed around the pick-up target 100.

Therefore, a relative position of the pick-up target 100 relative to the correction marker 300 may be identified by comparing the three-dimensional shape of the correction marker 300. On the basis of the relative position of the pick-up target 100, pick-up information 501 including posture information and movement information that allow the pick-up unit 200 to pick up the pick-up target 100.

The control unit 600 controls the posture and movement of the pick-up unit 200 on the basis of the pick-up information 501 provided by the analysis unit 500.

The pick-up system of an autonomous charging robot for an electric vehicle according to the present disclosure separately provides the correction marker to quantitatively correct the posture and movement to allow the pick-up unit 200 to pick up the pick-up target 100, such that the pick-up target 100 may be concisely configured. This may induce a beneficial virtuous cycle that may reduce difficulty of the posture and movement of the pick-up unit 200 for picking up the pick-up target 100 and also reduce difficulty of the pick-up operation.

That is, the pick-up system of an autonomous charging robot for an electric vehicle according to the present disclosure has an advantage in that a load of hardware and software provided in an autonomous robot may be minimized, and a pick-up operation of the pick-up target 100 may be simplified and clarified.

As described above, the pick-up feature point 101 provided by the pick-up target 100 is based on the morphological properties of the pick-up target 100.

In a general pick-up facility, the morphological properties of the pick-up target broadly provide two functions.

First, the morphological properties of the pick-up target are reflected in the point cloud created by the scanner that scans the pick-up target, and the analysis unit, which analyzes the pick-up target, recognizes the shape of the pick-up target.

Therefore, the morphological properties of the pick-up target may have uniqueness and complexity so that the pick-up target may be clearly distinguished.

Second, the pick-up target needs to have morphological properties compatible with the pick-up operation of the pick-up unit by the pick-up unit.

For example, in case that the pick-up unit is a hand structure of a humanoid robot, the pick-up target may be formed in a shape that is easy to grip with the hand.

However, in the case of a device, such as an autonomous robot, having a clear quantitative limitation of hardware and software, the complexity of the pick-up operation is inevitably set to a very low level. The morphological properties of the pick-up target compatible with the low-complexity pick-up operation may also be set to the morphological properties with low complexity.

Therefore, the two types of morphological properties of the pick-up target are contradictory qualitative properties.

The pick-up system of an autonomous charging robot for an electric vehicle according to the present disclosure discloses the technical spirit of separating the morphological properties of the pick-up target and separately provides the correction marker 300 for inducing the pick-up operation of the pick-up unit 200 for picking up the pick-up target 100. The pick-up system may clearly recognize the pick-up target 100 even while decreasing morphological complexity of the pick-up target 100. The decrease in morphological complexity of the pick-up target 100 enables the autonomous robot, which is equipped with limited hardware and software, to securely pick up the pick-up target 100 even by the simple, concise pick-up operation.

In particular, the pick-up system of an autonomous charging robot for an electric vehicle according to the present disclosure may solve the problem of the three-dimensional shape scanning system caused by the structured light.

A currently known three-dimensional structure scanning system using structured light is effective in detecting approximate positions and morphological properties of a three-dimensional structure subjected to scanning.

However, as described above, the pick-up system intended to be implemented in the present disclosure is an autonomous robot mounting technology having limited functions and performance of hardware and software, and requires position information required for an accurate pick-up operation on the basis of a limited resource.

That is, because the pick-up unit of the autonomous robot having limited performance and function needs to be used to accurately pick up the pick-up target without an error, it is impossible to prevent many errors in case that the currently used three-dimensional structure scanning system using the structured light is applied in an intact manner.

The main causes of the above-mentioned errors may be described in the following two main ways.

The first cause is an error occurring during a process of extracting the feature point, and the second cause is an error of the feature point caused when the projected structured light is reflected by a surface of the pick-up target.

First, the error occurring during the process of extracting the feature point is a kind of quantization error.

The basic principle of the scanning system using structured light is a technology that projects light with a particular coordinate system onto the surface subjected to scanning, detects the light, which is reflected by the surface subjected to scanning, at different angles, and displays shapes of the three-dimensional surfaces as a plurality of feature points.

In this case, in case that the resolution of the used structured light is not increased to the extreme resolution, an error occurs in which the shape of the scanning target cannot be applied between the feature points, and a change in shape of a size smaller than the resolution of the structured light cannot be detected.

Next, the error caused by the reflection of the structured light is caused by the feature of the shape of the surface of the scanning target.

The structured light is also a kind of electromagnetic wave, and according to the basic principle of the scanning system using structured light, the reflection by the scanning surface is detected, as described above.

To this end, ideal scanning may be performed in case that the total amount of structured light reflected by the scanning surface reaches a sensor for detecting the structured light.

However, depending on the surface roughness and other surface conditions of the scanning target, scattering may occur as well as reflection.

In addition, in case that the surface of the scanning target has a curved or particularly angled shape, the initially reflected structured light may be projected onto another surface of the scanning target, which may cause errors in the extracted feature points.

It is necessary to install various sensors in the pick-up unit of the autonomous robot to reduce the likelihood of pick-up failure caused by the above-mentioned errors in order for the autonomous robot to pick up a particular object in spite of the problems of the structured light system.

In other words, the general structured light scanning systems currently introduced cannot recognize the exact position of the surface of the pick-up target. Therefore, the pick-up unit itself needs to be equipped with various precise sensing means to compensate or supplement the accuracy.

However, as described above, the autonomous robot often does not have enough H/W and S/W resources to mount a variety of sensors or to analyze the various measured values detected by these sensors.

The pick-up system of an autonomous charging robot for an electric vehicle according to the present disclosure may easily solve these problems.

Figure 2:
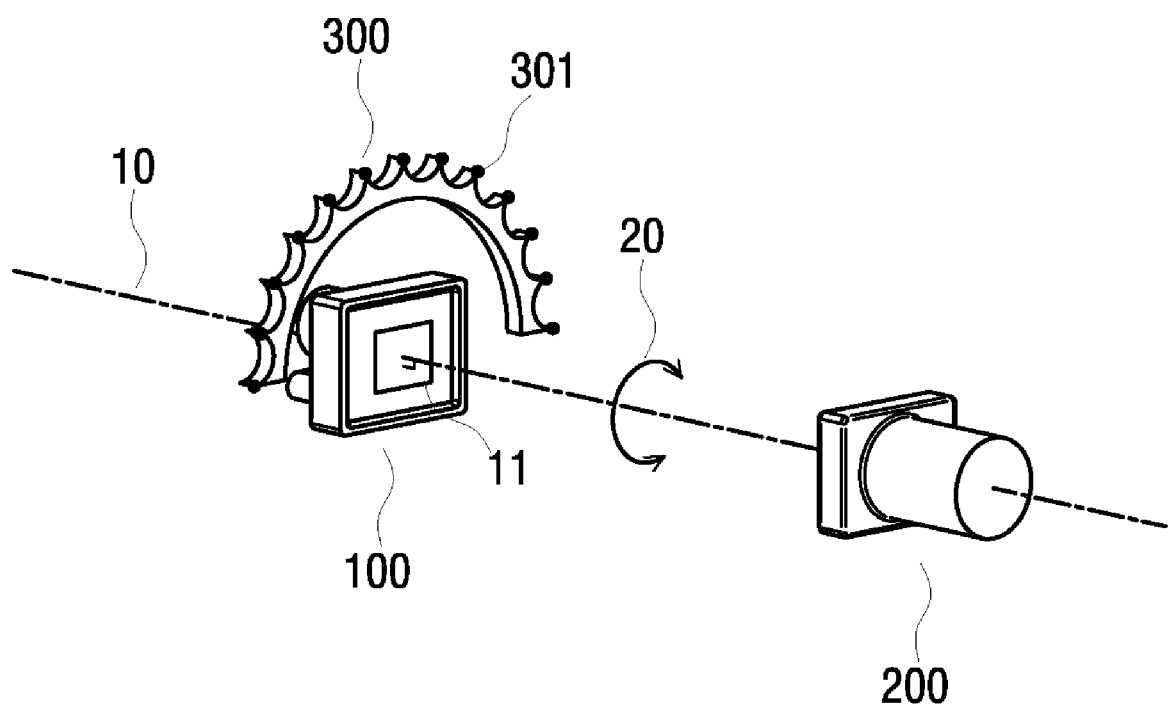
FIG. 2 is a view for explaining a correction marker 300, a pick-up target 100, and a pick-up unit 200 in a first embodiment of the pick-up system of an autonomous charging robot for an electric vehicle according to the present disclosure.

FIG. 2 is a view for explaining the correction marker 300, the pick-up target 100, and the pick-up unit 200 in the first embodiment of the pick-up system of an autonomous charging robot for an electric vehicle according to the present disclosure.

Figure 3:
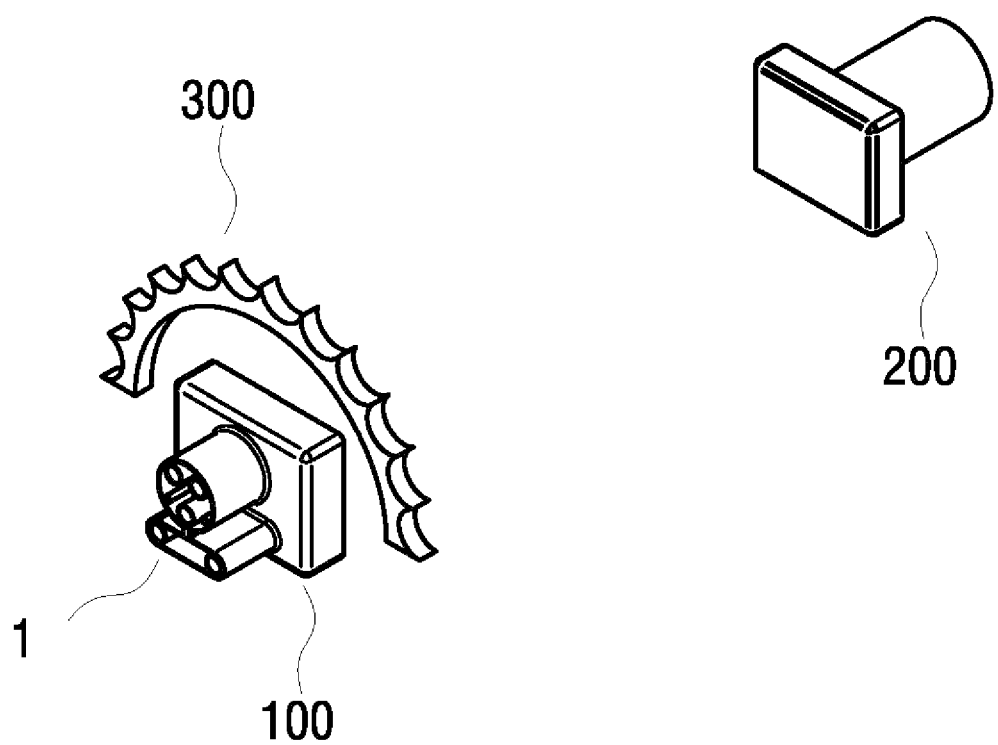
FIG. 3 is a perspective view of FIG. 2 when viewed at another angle.

FIG. 3 is a perspective view of FIG. 2 when viewed at another angle.

In the pick-up system of an autonomous charging robot for an electric vehicle according to the present embodiment, the components excluding the correction marker 300, the pick-up target 100, and the pick-up unit 200 are identical to those in FIG. 1, and thus a description thereof will be omitted.

In the pick-up system of an autonomous charging robot for an electric vehicle according to the present embodiment, the correction marker 300 is formed such that the correction feature points 301 are disposed on an orientation plane 11, i.e., a plane that meets an orientation line 10 at a right angle, and the orientation line 10 is a straight line along which the pick-up unit 200 is directed toward the pick-up target 100.

Therefore, in the pick-up system of an autonomous charging robot for an electric vehicle according to the present embodiment, the correction marker 300 may correct or set the position of the pick-up unit 200 in a rectilinear direction on the orientation plane 11 and correct or set the posture of the pick-up unit 200 in a roll rotation direction about the orientation line 10.

With reference to FIG. 2, the correction marker 300 of the pick-up system of an autonomous charging robot for an electric vehicle according to the present embodiment is formed such that the correction feature points 301 are disposed in the roll rotation direction 20 about the orientation line 10.

The correction feature points 301 disposed in the roll rotation direction easily determines whether to correct the posture of the pick-up unit 200 in the roll rotation direction.

Furthermore, with reference to FIG. 2, the correction marker 300 may be formed such that the correction feature points 301 are disposed on an arc defined about an orientation point at which the orientation line 10 and the orientation plane 11 meet together.

The correction feature points 301 disposed on the arc, i.e., the correction feature points 301 disposed in the roll rotation direction not only facilitates the determination of whether to correct the posture in the roll rotation direction, but also facilitates the determination of whether to correct the position on the orientation plane 11 in the rectilinear direction.

Furthermore, the correction feature points 301 may be formed to be disposed at equal angles with respect to the orientation point.

The correction feature points 301 disposed at the equal angles facilitates the quantification of the degree of the correction in the roll rotation direction.

In FIG. 2, in the pick-up system of an autonomous charging robot for an electric vehicle according to the present embodiment, the correction marker 300 particularly has a plate shape and has a plurality of tip shapes disposed on an arc at equal angles with respect to the orientation point and protruding outward. The tips of the tip shapes are shaped to define the plurality of correction feature points 301.

In addition, in the pick-up system of an autonomous charging robot for an electric vehicle according to the present embodiment, the pick-up unit 200 may be configured to pick up the pick-up target 100 by using an attractive force of an electromagnet or permanent magnet, and the pick-up target 100 may have a polygonal shape having upper and lower portions or left and right portions that may be distinguishable.

In this case, the pick-up unit 200 is docked by being fitted with the pick-up target 100, i.e., the pick-up unit and the pick-up target are fitted with each other, such that the pick-up unit 200 may pick up the pick-up target.

The pick-up operation of the pick-up unit 200, which picks up the pick-up target 100 by using the electromagnet or permanent magnet, is simplified and clarified.

In order to simplify and clarify the pick-up operation as described above, the shape of the pick-up target 100 needs to be maintained to be unique and complex so that the pick-up unit 200 easily approaches the pick-up target 100 and corrects the position of the pick-up target 100.

However, in the pick-up system of an autonomous charging robot for an electric vehicle according to the present disclosure, the movement and posture correction of the pick-up unit 200 is provided by the correction marker 300, such that the shape of the pick-up target 100 may be simplified.

In this case, the pick-up target 100 may have a polygonal shape having the upper and lower portions or the left and right portions that may be distinguishable.

As described above, the pick-up target 100 is the structure for providing the pick-up feature point 101, and the pick-up unit 200 is fixed or attached to any device or object intended to be picked up.

With reference to FIG. 3, in the pick-up system of an autonomous charging robot for an electric vehicle according to the present embodiment, the pick-up target 100 is installed on an electric vehicle charging plug 1.

That is, in case that the pick-up system of an autonomous charging robot for an electric vehicle is installed on an autonomous robot for charging an electric vehicle, the pick-up unit 200 may pick up the pick-up target 100 and then docks the charging plug, to which the pick-up target 100 is fixed, into a charging socket of the electric vehicle.

Because the charging plug has different shapes in an upward/downward direction, the pick-up unit 200 easily picks up the pick-up target 100 and then accurately docks the charging plug into the charging socket.

In addition, in this case, the pick-up target 100 and the pick-up unit 200 may be fastened to each other by fitting.

When the pick-up target 100 is picked up by the pick-up unit 200 by a magnetic force, the pick-up target 100 may be moved or rotated in a direction perpendicular to the magnetic force, which may cause failure of docking between the charging plug and the charging socket.

In case that the pick-up target is configured to be fastened by being fitted with the pick-up unit and the pick-up target has a shape having upper and lower portions or left and right portions that may be distinguishable, a slip between the pick-up unit 200 and the pick-up target 100 may be prevented.

Figure 4:
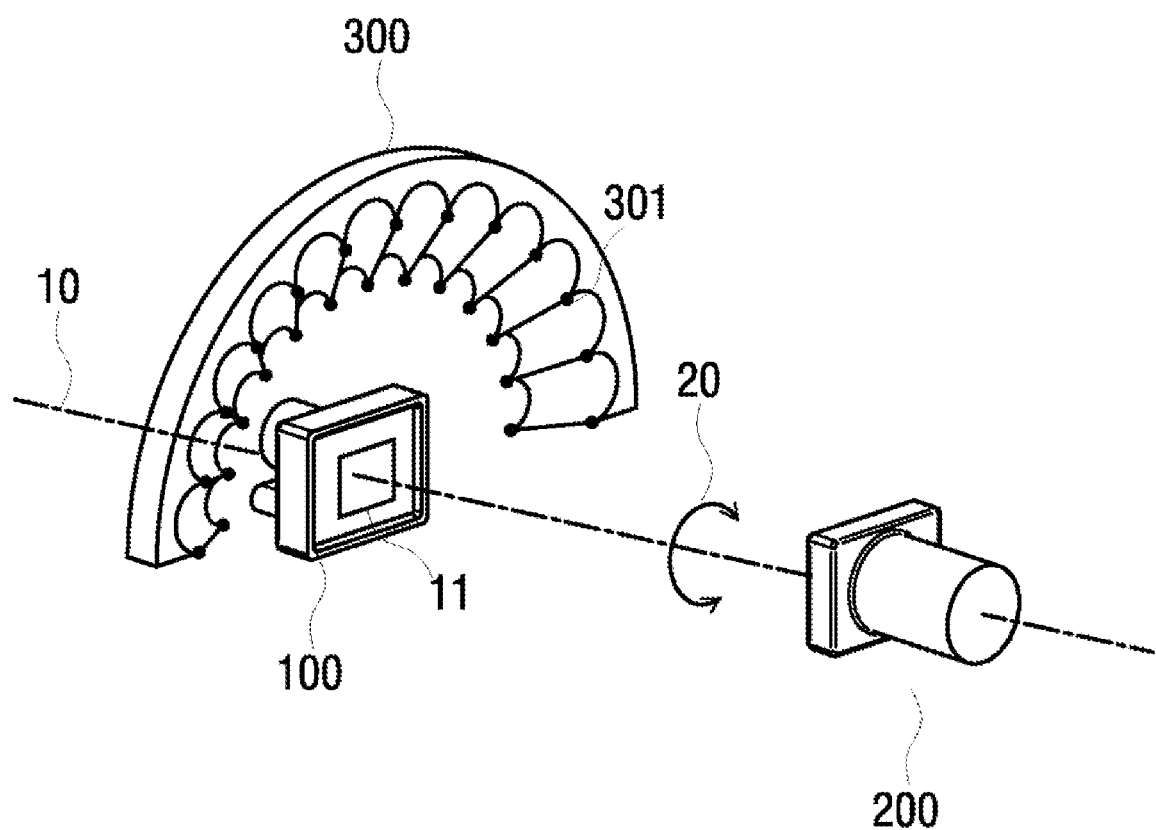
FIG. 4 is a view illustrating a second embodiment of the pick-up system of an autonomous charging robot for an electric vehicle according to the present disclosure.

FIG. 4 is a view illustrating a second embodiment of the pick-up system of an autonomous charging robot for an electric vehicle according to the present disclosure.

In FIG. 4, in the pick-up system of an autonomous charging robot for an electric vehicle according to the present embodiment, the correction feature points 301 of the correction marker 300 are configured as an assembly of a plurality of correction feature points 301 disposed on a plurality of orientation planes parallel to one another.

In the pick-up system of an autonomous charging robot for an electric vehicle according to the present embodiment, the correction marker 300 provides depth properties between the different correction feature points 301. In particular, the depth properties are concentrated toward the orientation point or the orientation line, such that it is also possible to easily determine whether to correct the posture in a direction in which the orientation line is inclined.

According to the present disclosure, the correction marker for providing the correction feature point is used, which makes it possible to minimize the occurrence of an error caused by a structured light scanner method and innovatively increase a likelihood of implementation of a pick-up operation with high reliability even in the pick-up system of an autonomous charging robot for an electric vehicle that has a limited resource.

While the present disclosure has been shown and described in connection with the exemplary embodiments, it will be apparent to those skilled in the art that modifications and variations can be made without departing from the spirit and scope of the disclosure as defined by the appended claims.

What is claimed is:

1. A pick-up system of an autonomous charging robot for an electric vehicle, the pick-up system comprising:
   a pick-up target, which is installed on an electric vehicle charging plug, configured to provide a pick-up feature point;
   a pick-up unit configured to pick up the pick-up target and dock the electric vehicle charging plug, which is installed with the pick-up target, into a charging socket of the electric vehicle;
   a correction marker that is a three-dimensional structure installed around the pick-up target and configured to provide a plurality of correction feature points;
   a scanner configured to use structured light, detect a target object including the pick-up target and the correction marker installed around the pick-up target, and create a point cloud including the pick-up feature point and the correction feature points;
   an analysis unit configured to calculate pick-up information including posture information and movement information on the basis of the relative position of the pick-up target relative to the correction marker, which allow the pick-up unit to pick up the pick-up target, by comparing the pick-up feature point and the correction feature points, which are extracted on the basis of the point cloud created by the scanner, and three-dimensional shape information on the pick-up target and the correction marker installed around the pick-up target with a single acquired three-dimensional shape of the pick-up target and the correction marker; and
   a control unit configured to control a posture and movement of the pick-up unit on the basis of the pick-up information,
   wherein the correction marker is formed such that the correction feature points are disposed on an orientation plane that is a plane that meets an orientation line at a right angle, the orientation line being a straight line along which the pick-up unit is directed toward the pick-up target,
   wherein the correction marker is formed such that the correction feature points are disposed in a roll rotation direction about the orientation line,
   wherein the correction feature points of the correction marker are disposed on an arc defined about an orientation point at which the orientation line and the orientation plane meet together,
   wherein the correction marker is formed such that the correction feature points are disposed at equal angles with respect to the orientation point,
   wherein the correction marker has a plate shape and has a plurality of tip shapes disposed on an arc at equal angles with respect to the orientation point and protruding outward, and tips of the tip shapes define the plurality of correction feature points,
   wherein the correction marker is formed such that the correction feature points are configured as an assembly of the plurality of correction feature points disposed on a plurality of orientation planes parallel to one another,
   wherein the pick-up unit picks up the pick-up target by using an attractive force of an electromagnet or permanent magnet,
   wherein the pick-up target has a polygonal shape having upper and lower proportions or left and right portions that are distinguishable, and
   wherein the pick-up unit picks up the pick-up target by being fitted and docked with the pick-up target.

* * * * *